Dec. 16, 1930.  D. K. BLAKE  1,785,612
SYSTEM OF ELECTRIC DISTRIBUTION
Filed Aug. 23, 1927
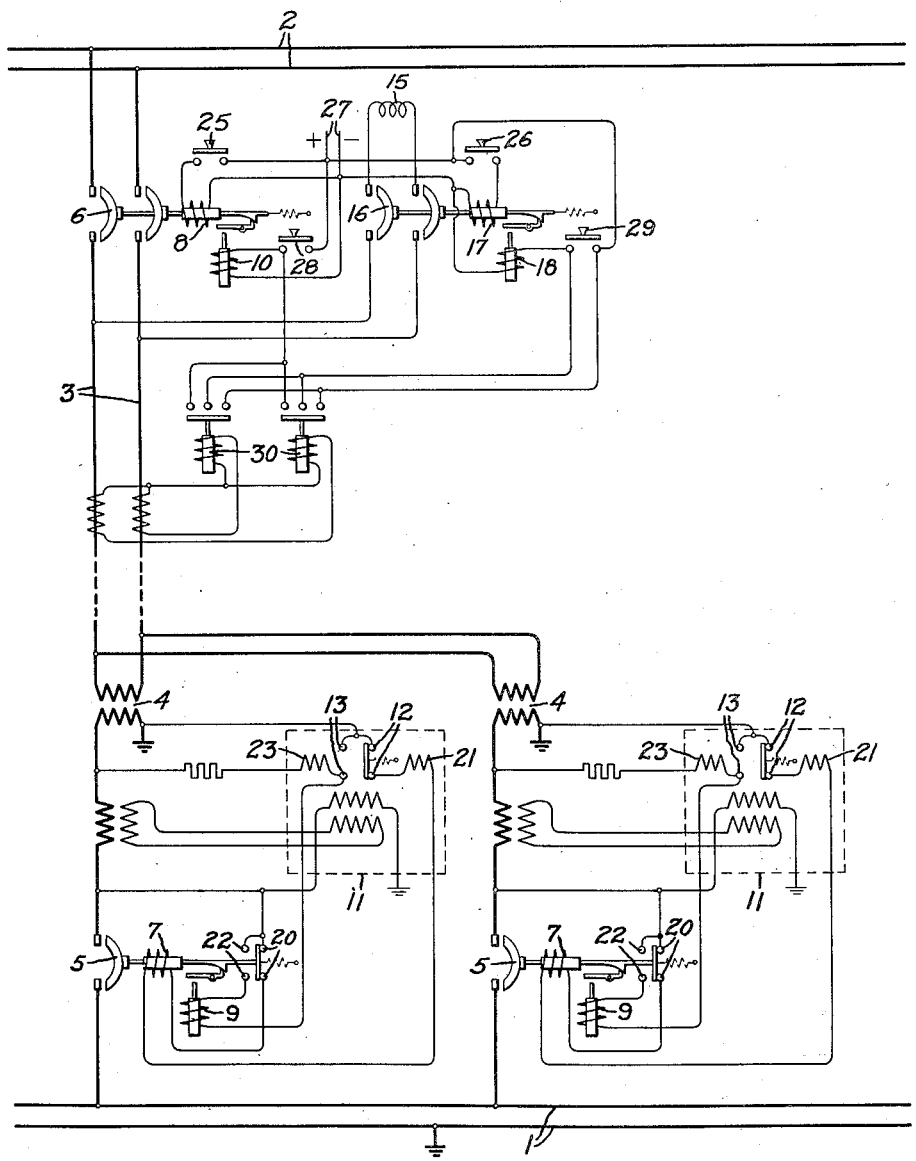
Inventor:
David K. Blake,
by *(signature)*
His Attorney.

Patented Dec. 16, 1930

1,785,612

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

SYSTEM OF ELECTRIC DISTRIBUTION

Application filed August 23, 1927. Serial No. 214,951.

My invention relates to systems of electric distribution and particularly to alternating current networks.

Where low voltage alternating current networks are used it is common practice to supply current to the network at various points by means of step-down transformers, the primaries of which are connected to feeders fed from the same or different sources of current. With such arrangements it is desirable to be able to disconnect each transformer from the network whenever the respective feeder is disconnected from its source of current and automatically to reconnect the transformer secondary to the network when the feeder is reconnected to its source of current. For accomplishing this result various arrangements have been proposed for disconnecting the transformer secondary from the network in response to the flow of electric energy from the network to the transformer and for reconnecting the transformer secondary to the network in response to the reenergization of the feeder to which the primary of the transformer is connected.

When these various control arrangements are used to control the connections between the network and the secondaries of a plurality of transformers, the primaries of which are connected in parallel across the same feeder, difficulty sometimes occurs due to pumping of some of the circuit breakers in the transformer secondary circuits. This pumping is due to the fact that one circuit breaker may open before another so that the transformer secondary associated with the open breaker is still energized so that the conditions may be right to cause the breaker to reclose immediately.

One object of my invention is to provide an arrangement for preventing a secondary circuit breaker in such a system from pumping.

In accordance with the preferred embodiment of my invention I provide means for preventing a circuit breaker from being reclosed until after the secondary voltage of its associated transformer has decreased below a predetermined value after the circuit breaker opens.

My invention will be better understood from the following description taken in connection with the accompanying drawing and its scope will be pointed out in the appended claims.

In the accompanying drawing I have shown my invention in connection with a modification of the control arrangement shown in my Letters Patent 1,581,831, granted April 20, 1926. It will be obvious, however, that my invention is applicable to other control arrangements, examples of which are well known to the art, for controlling the connection either between a transformer and a network or between any two electric circuits.

Referring to the drawing, 1 represents a low voltage alternating current network which is adapted to be supplied with current from a suitable source of current, shown as a supply circuit 2, by means of a plurality of feeders 3, only one of which is shown in the drawing in order to simplify the disclosure. A plurality of transformers 4 are provided for supplying current from the feeder 3 to the network. The primaries of the transformers are permanently connected across the feeder 3 and the secondaries of the transformers are adapted to be connected across the network 1 by suitable switching means 5. The feeder 3 is adapted to be connected to the supply circuit 2 by any suitable switching means 6. As shown in the drawing the switching means 5 and 6 are latched-in circuit breakers and are respectively provided with closing coils 7 and 8 and trip coils 9 and 10.

For controlling the opening and closing of each circuit breaker 5 a power directional relay 11 is associated with each circuit breaker 5 and controls the circuits of its closing coil 7 and its trip coil 9. These power directional relays, which may be of any suitable type, examples of which are well known in the art, are connected in any suitable manner to the secondaries of the respective transformers 4 so that they are energized in accordance with the energy flowing between the network and the respective transformers. Each relay 11 is provided with two sets of contacts 12 and 13. Each relay is biased so that its contacts 12 are closed whenever the energy flow from the network 1 to the associated transformer 4 is less than a certain amount and also when the energy flow is above a predetermined amount and from the respective transformer 4 to the network. The power directional relays 11 are arranged so that they close their respective contacts 13 only when a predetermined amount of energy flows from the network to the respective transformer 4. In the particular arrangement disclosed in the drawing the amount of reverse energy required to cause a relay 11 to open its contacts 12 and close its contacts 13 is greater than the magnetizing current of the respective transformer so that merely opening the circuit breaker 6 in the feeder 3 does not cause sufficient reverse energy to flow to cause the relay 11 to close its contacts 13. A fault on the feeder, however, causes sufficient reverse energy to flow to operate the relay so that it closes its contacts 13.

In order to cause sufficient reverse energy to flow from the network 1 to the respective transformers 4 to operate the associated relays 11, I provide a current consuming device such as a reactor 15 which is arranged to be connected across the feeder 3 by suitable switching means 16. As shown in the drawing, this switching means is a latched-in circuit breaker which is provided with a closing coil 17 and a trip coil 18.

The contacts 12 of each power directional relay 11 are in the circuit of the closing coil 7 of the associated circuit breaker 5. The closing coil circuit is connected across the secondary of the associated transformer 4 and includes auxiliary contacts 20 on the circuit breaker which are closed when the circuit breaker is open. Therefore, whenever a circuit breaker 5 is open, the associated transformer 4 energized and the contacts 12 of the associated power directional relay 11 closed, the circuit for the closing coil 7 of the circuit breaker is completed to close the circuit breaker. Each relay 11 is also provided with the usual holding coil 21, which is connected in series with the contacts 12 and which maintains the contacts 12 closed as long as the circuit through the contacts is completed.

The contacts 13 of each power directional relay 11 are in the circuit of the trip coil 9 of the associated circuit breaker 5. This circuit also includes auxiliary contacts 22 on the circuit breaker so that whenever the contacts of the relay 11 are closed and the associated circuit breaker 5 is closed the circuit for the trip coil 9 of the circuit breaker is completed across the secondary of the associated transformer 4 to effect the opening of the circuit breaker.

It will be observed that, as soon as a circuit breaker 5 opens, reverse energy stops flowing from the network to the associated transformer 4 so that, if no other means were provided, the associated power directional relay 11 would return to its normal position, in which position its contacts 12 are closed. If the relay 11 should close its contacts 12 before all of the other circuit breakers 5 have opened even though the switch 6 is open, a circuit would be immediately closed to energize the closing coil 7 of the circuit breaker 5 associated with the power directional relay 11 whose contacts 12 are closed since the transformer associated with the relay 11 under consideration would be energized from one of the other transformers. In order to prevent the pumping action which would result from such an arrangement I provide each relay 11 with a holding coil 23 which is arranged to be connected directly across the secondary of the associated transformer 4 in response to the closing of the contacts 13 of the relay 11. Each holding coil is arranged to maintain its associated contacts 13 closed as long as the transformer secondary voltage is above a predetermined value. Therefore, with this arrangement a relay 11 does not return to its closing position after it has moved to its opening position until after all of the circuit breakers 5 have opened.

For controlling the opening and closing of the circuit breakers 6 and 16, I provide control switches 25 and 26 which, when closed, respectively connect the closing coils 8 and 17 across a suitable control circuit 27 and control switches 28 and 29 which, when closed, connect the trip coils 10 and 18 across the control circuit 27. The trip coils 10 and 18 are also arranged to be connected across the control circuit 27 by suitable over-current relays 30 which are connected to the feeder 3 so that they respond to a predetermined abnormal current in the feeder.

The operation of the arrangement shown in the drawing is as follows: When it is desired to connect the feeder 3 between the supply circuit 2 and the network 1 the control switch 25 is closed, which completes a circuit for the closing coil 8 to close the circuit breaker 6. The closing of the circuit breaker 6 connects the feeder 3 to the supply circuit 2. As soon as the feeder 3 is energized a circuit is completed for the closing coil 7 of each circuit breaker 5 to connect the secondary of its associated transformer 4 to the network 1. The circuit of each closing coil 7 is from the grounded secondary terminal of its associated transformer 4 through contacts 12 of its associated power directional relay 11, holding coil 21 of the relay 11, closing coil 7, contacts 20 on its associated circuit breaker 5 to the ungrounded secondary terminal of the transformer 4.

When it is desired to disconnect the feeder 3 from the supply circuit 2 and the network 1, control switch 28 is first closed so as to complete the circuit of the trip coil 10 so as to effect the opening of the circuit breaker 6. After the circuit breaker 6 has been opened control switch 26 is closed to complete the circuit of the closing coil 17 of the circuit breaker 16 so as to connect the reactor 15 across the feeder 3. As soon as the reactor 15 is connected across the feeder 3 sufficient energy flows from the network to each transformer secondary to cause the associated power directional relay 11 to open its contacts 12 and close its contacts 13, thereby completing a circuit for the trip coil 9 of its associated circuit breaker 5. The circuit of each trip coil 9 is from the grounded secondary terminal of its associated transformer 4 through contacts 13 of the associated power directional relay 11, trip coil 9, contacts 22 on the associated circuit breaker 5 to the ungrounded secondary terminal of the transformer 4. Each relay 11 by closing its contacts 13 also completes a circuit for its holding coil 23 directly across the secondary of the associated transformer 4. Therefore, all of the power directional relays 11 are maintained in their tripping position until after all of the circuit breakers 5 have opened. It will be observed that as long as any one of the circuit breakers 5 is closed all of the transformers 4 are energized from the network 1 and, therefore, the secondary voltages of the transformers are normal. After the last circuit breaker 5 is opened all of the transformers become deenergized so that all of the power directional relays 11 return to their normal positions.

While I have, in accordance with the patent statutes, shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:

1. In combination, two electric circuits, switching means for connecting said circuits together, power directional means for controlling the opening and closing of said switching means, and means responsive to the movement of said power directional means to its opening position while a certain one of said circuits is energized for maintaining said power directional means in its opening position as long as said one of said circuits is energized.

2. In combination, a plurality of parallel connected circuits, switching means in each circuit, power directional means associated with one of said circuits arranged to effect the opening and closing of its associated switching means in response to predetermined electrical conditions of the associated circuit, and means for preventing said power directional means from effecting the closing of its associated switching means after it has effected the opening thereof until all of the switching means in the other circuits are open.

3. In combination, a plurality of transformers having their primaries connected in parallel and their secondaries connected in parallel, a circuit breaker in each transformer secondary circuit, a reverse power relay associated with one of said circuits arranged when in one position to effect the closing of the associated circuit breaker and when in another position to effect the opening of the associated circuit breaker, a holding coil for maintaining said relay in its opening position, and a circuit for said holding coil arranged to be completed across the secondary of the associated transformer in response to the movement of said relay to its opening position.

4. In combination, a source of alternating current, a network, a feeder connected to said source, a plurality of transformers having their primaries connected to said feeder and their secondaries connected to said network, a circuit breaker between each transformer secondary and the network, means responsive to the flow of energy from said network to said feeder for effecting the opening of said circuit breakers and responsive to a predetermined voltage condition of said feeder for effecting the reclosing of said circuit breakers, and means for preventing the reclosure of any of said circuit breakers when it is opened in response to a reversal of energy until after all of the other circuit breakers have been opened.

5. In combination, a source of alternating current, a network, a feeder connected to said source, a plurality of transformers having their primaries connected to said feeder and their secondaries connected to said network, a circuit breaker between each transformer secondary and the network, means responsive to the flow of energy from said network to said feeder for effecting the opening of said circuit breakers and responsive to a predetermined voltage condition of said feeder for effecting the reclosing of said circuit breakers, and means responsive to the voltage across said feeder for preventing the reclosure of a circuit breaker when it is opened in response to a reversal of energy until after the voltage across said feeder has been decreased below a predetermined value.

6. In combination, a source of alternating current, a network, a feeder connected to said source, a plurality of transformers having their primaries connected to said feeder and their secondaries connected to said network, a circuit breaker between each transformer secondary and the network, and means for effecting the opening and closing of said circuit breakers comprising a reverse power relay associated with each of said circuit breakers arranged to operate in response to a predetermined flow of energy from said network to the associated transformer to effect the opening of the associated circuit breaker and to control the reclosing of the associated circuit breaker, and a holding coil for each reverse power relay for maintaining it in its opening position until the secondary voltage of its associated transformer decreases below a predetermined value.

7. In combination, a source of alternating current, a network, a feeder connected to said source, a plurality of transformers having their primaries connected to said feeder and their secondaries connected to said network a circuit breaker between each transformer secondary and the network, each circuit breaker being provided with a closing coil and a trip coil, a circuit for each closing coil and trip coil, a reverse power relay associated with each transformer secondary circuit, contacts in the circuit of each tripping coil arranged to be closed in response to the operation of the associated reverse power relay when energy flows from the network to the associated transformer secondary, contacts in the circuit of each closing coil arranged to be opened in response to the operation of the associated reverse power relay when energy flows from the network to the associated transformer secondary, and means responsive to the closing of said first mentioned contacts for maintaining said second mentioned contacts open until the voltage of the feeder decreases below a predetermined value.

8. In combination, a plurality of parallel connected circuits, switching means in each circuit, means for effecting the opening of each switching means, means for reclosing each switching means in response to a predetermined voltage condition of the respective circuit, and means for preventing the reclosing means of a switching means from effecting the reclosure thereof after the opening thereof until all of the switching means in the other circuit are opened.

9. In combination, a source of alternating current, a network, a feeder connected to said source, a plurality of transformers having their primaries connected to said feeder and their secondaries connected to said network, a circuit breaker between each transformer secondary and the network, means for effecting the opening of each circuit breaker, means for reclosing each circuit breaker in response to a predetermined voltage condition of the feeder, and means for preventing the reclosure of a circuit breaker after the opening thereof until all of the other circuit breakers are open.

10. In combination, two electric circuits, a circuit breaker interconnecting said circuits, means including a power directional relay for effecting the opening of said circuit breaker in response to power flow from a certain one of said circuits to the other circuit, and means for reclosing said circuit breaker including means for preventing said circuit breaker from being reclosed until the voltage of said other circuit decreases below a predetermined value after the opening of said circuit breaker.

11. In combination, two electric circuits a circuit breaker interconnecting said circuits, means including a power directional relay for effecting the opening of said circuit breaker in response to power flow between said circuits in a predetermined direction and the subsequent closing of said circuit breaker in response to a predetermined phase relation between the voltages of said circuits, and means for preventing said relay from effecting the reclosing of said circuit breaker until a certain one of said circuits has been deenergized and subsequently reenergized after the opening of said circuit breaker.

In witness whereof, I have hereunto set my hand this 20th day of August, 1927.

DAVID K. BLAKE.